(12) United States Patent
Lee et al.

(10) Patent No.: US 8,634,678 B2
(45) Date of Patent: Jan. 21, 2014

(54) PHASE SHIFTER AND ELECTRO-OPTIC MODULATION DEVICE INCLUDING THE SAME

(75) Inventors: Kwang-Hyun Lee, Suwon-si (KR); Dong-Jae Shin, Seoul (KR); Kyoung-Ho Ha, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 131 days.

(21) Appl. No.: 13/239,936

(22) Filed: Sep. 22, 2011

(65) Prior Publication Data

US 2012/0099813 A1   Apr. 26, 2012

(30) Foreign Application Priority Data

Oct. 22, 2010   (KR) ................... 10-2010-0103379

(51) Int. Cl.
  *G02F 1/035*   (2006.01)
(52) U.S. Cl.
  USPC .......................................................... 385/3
(58) Field of Classification Search
  USPC ...................................................... 385/2, 3
  See application file for complete search history.

(56) References Cited

U.S. PATENT DOCUMENTS

| 7,136,544 B1* | 11/2006 | Gunn et al. ................. 385/3 |
| 7,142,761 B2* | 11/2006 | Liu et al. .................. 385/131 |
| 2005/0207691 A1* | 9/2005 | Keyser et al. ............... 385/1 |

FOREIGN PATENT DOCUMENTS

| JP | 2009-205154 | 9/2009 |
| JP | 2009-302376 | 12/2009 |

OTHER PUBLICATIONS

English Abstract for Publication No. 2009-302376, retrieved on May 26, 2011.
English Abstract for Publication No. 2009-205154, retrieved on May 26, 2011.

* cited by examiner

*Primary Examiner* — Omar Rojas
(74) *Attorney, Agent, or Firm* — F. Chau & Associates, LLC (57) ABSTRACT

A phase shifter includes an optical waveguide, a plurality of impurity regions and a plurality of electrodes. The optical waveguide receives an optical input signal and outputs an optical output signal. The impurity regions include respective charge carriers. The impurity regions are disposed in contact with the optical waveguide at respective contact surface, where at least one of the contact surfaces has a zigzag pattern. The electrodes are connected to the respective impurity regions. Application of an electrical signal to at least one of the electrodes phase-shifts the optical output signal with respect to the optical input signal. Therefore, the phase shifter may efficiently vary a magnitude of the phase shift of the optical output signal.

13 Claims, 9 Drawing Sheets

PHASE SHIFTER AND ELECTRO-OPTIC MODULATION DEVICE INCLUDING THE SAME

CROSS-REFERENCE TO RELATED APPLICATION(S)

This application claims priority under 35 USC §119 to Korean Patent Application No. 10-2010-0103379, filed on Oct. 22, 2010, in the Korean Intellectual Property Office (KIPO), the contents of which are herein incorporated by reference in their entirety.

BACKGROUND

1. Technical Field

Exemplary embodiments are directed to electro-optic modulation, and more particularly to a phase shifter and an electro-optic modulation device including the same.

2. Description of the Related Art

In recent years, photonic integrated circuits (PIC), in which electronic components interface with each other through photonic interconnection paths rather than through electrical interconnection paths, have been developed to increase transmission capacity between the electronic components. A photonic communication technology based on silicon materials may be referred to as silicon photonics. A silicon PIC includes electro-optic modulators formed from the silicon materials to modulate optical signals passing through the photonic interconnection paths between the electronic components in the silicon PIC.

SUMMARY

Some exemplary embodiments provide a silicon phase shifter capable of efficiently controlling a phase of an optical signal passing therethrough.

Some exemplary embodiments provide an electro-optic modulation device capable of efficiently modulating an optical signal.

According to some exemplary embodiments, a phase shifter includes an optical waveguide, a plurality of impurity regions and a plurality of electrodes. The optical waveguide receives an optical input signal and outputs an optical output signal. Each impurity region includes a respective charge carrier. The impurity regions are disposed in contact with the optical waveguide at respective contact surfaces, where at least one of the contact surfaces has a zigzag pattern. The electrodes are connected to the respective impurity regions and may receive an electrical signal that corresponds to a phase-shift of the optical output signal with respect to the optical input signal.

The electrical signal adjusts densities of the respective charge carriers to vary a magnitude of phase shift of the optical output signal.

In an exemplary embodiment, the impurity regions may include a first impurity region and a second impurity region. The first impurity region may include first charge carriers, and may be disposed in contact with the optical waveguide at a first contact surface. The second impurity region may include second charge carriers, may be disposed in contact with the optical waveguide at a second contact surface.

The first and second contact surfaces may have respective zigzag patterns symmetrically formed with respect to the optical waveguide.

The first and second contact surfaces may have respective zigzag patterns in phase with each other.

The first and second contact surfaces may have respective zigzag patterns with different respective spatial periods.

The first charge carriers may be electrons and the second charge carriers may be electron holes.

The first impurity region may be doped with phosphorus and the second impurity region may be doped with boron.

The impurity regions further may include a third impurity region. The third impurity region may include third charge carriers, and may be disposed in contact with the optical waveguide at a third contact surface.

The first and second charge carriers may have a first conduction type and the third charge carriers may have a second conduction type opposite to the first conduction type.

The first and second charge carriers may be electrons and the third charge carriers may be electron holes.

The optical waveguide and the impurity regions may be formed on a silicon-on-insulator (SOI) substrate or a bulk silicon substrate.

The zigzag pattern may be one of a square wave-like pattern, a triangular wave-like pattern, a sine wave-like pattern, a trapezoid wave-like pattern and a polygonal wave-like pattern, which repeat themselves along the propagation direction of the optical waveguide.

According to some exemplary embodiments, an electro-optic modulation device includes a beam splitter, a phase shifting unit and a beam coupler. The beam splitter divides an optical input signal into a first optical signal and a second optical signal. The phase shifting unit includes at least one phase shifter. The phase shifting unit phase shifts at least one of the first and second optical signals based on an electrical signal to output a third optical signal and a fourth optical output signal. The beam coupler generates a modulated optical output signal based on the third and fourth optical signals. Each phase shifter includes an optical waveguide, a plurality of impurity regions, and a plurality of electrodes. The impurity regions include respective charge carriers. The impurity regions are disposed in contact with the optical waveguide at respective contact surfaces, where at least one of the contact surfaces has a zigzag pattern. The electrodes are connected to the respective impurity regions. Receipt of an electrical signal from at least one of the electrodes changes a density of the respective charge carriers that phase-shifts a corresponding optical signal with respect to the corresponding divided optical signal.

The beam splitter, the phase shifting unit and the beam coupler may be formed on a silicon substrate.

According to some exemplary embodiments, an electro-optic modulation device includes at least one phase shift unit. Each phase shift unit includes an optical waveguide, a first impurity region, a second impurity region, and first and second electrodes. The optical waveguide may receive an optical input signal and output an optical output signal. The first and second impurity region may include respective first and second charge carriers. The first and second impurity regions are disposed in contact with the optical waveguide at a first and second contact surface. The first and second electrodes are respectively connected to the first and second impurity regions. Receipt of an electrical signal from at least one of the electrodes may change a density of the first and second charge carriers that may phase-shift the optical output signal with respect to the optical input signal. At least one of the contact surfaces may have a zigzag pattern.

The electro-optic modulation device may further include a third impurity region including third charge carriers. The third impurity region may be disposed in contact with the optical waveguide at a third contact surface.

The first and second charge carriers may have a first conduction type and the third charge carriers may have a second conduction type opposite to the first conduction type.

The electro-optic modulation device may further include a beam splitter and a beam coupler. The beam splitter may divide an optical input signal into a first optical signal and a second optical signal. The beam coupler may receive and combine third and fourth optical signals to generate a modulated optical output signal. The first and second optical signals are transmitted to the phase shift unit, which phase shifts at least one of the first and second optical signals based on an electrical signal received at one of the electrodes to output the third optical signal and the fourth optical signal to the beam coupler.

The beam splitter, the phase shifting unit and the beam coupler may be formed on a silicon substrate.

DETAILED DESCRIPTION OF EXEMPLARY EMBODIMENTS

Various exemplary embodiments will be described more fully hereinafter with reference to the accompanying drawings, in which some exemplary embodiments are shown. The present inventive concept may, however, be embodied in many different forms and should not be construed as limited to the exemplary embodiments set forth herein. In the drawings, the layout and relative sizes of elements may be exaggerated for clarity. Like numerals refer to like elements throughout.

It will be understood that when an element is referred to as being "connected" or "coupled" to another element, it can be directly connected or coupled to the other element or intervening elements may be present.

Figure 1:
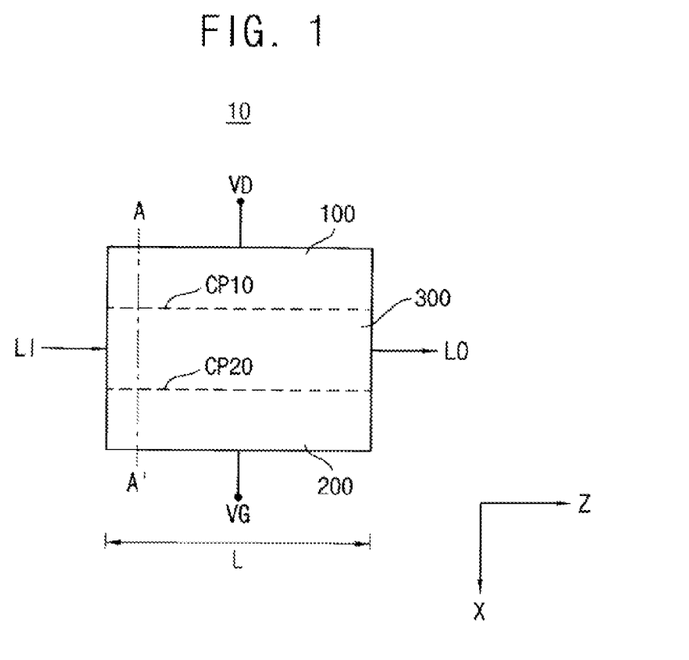
FIG. 1 is a cross-sectional view illustrating a phase shifter according to some exemplary embodiments.

FIG. 1 is a cross-sectional view illustrating a phase shifter according to some exemplary embodiments.

Referring to FIG. 1, a phase shifter 10 includes an optical waveguide 300 of length L, a plurality of impurity regions 100 and 200 and a plurality of electrodes VD and VG. Although, for convenience of illustration, two impurity regions 100 and 200 and two respective electrodes VD and VG are illustrated, the phase shifter 10 may include more than two impurity regions and more than two respective electrodes according to other exemplary embodiments. The optical waveguide 300 receives an optical signal LI and outputs a phase-shifted optical output signal LO. The phase shifter 10 receives the optical signal LI though the optical waveguide 300 and generates the optical output signal LO that may have a different phase with respect to the optical signal LI. The impurity regions 100 and 200 include first charge carriers and second charge carriers, respectively. The impurity regions 100 and 200 contact the optical waveguide 300 at respective contact surfaces CP10 and CP20. The first contact surface CP10 is between the first impurity region 100 and the optical waveguide 300. The second contact surface CP20 is between the second impurity region 200 and the optical waveguide 300. At least one of the contact surfaces CP10 and CP20 may have a zigzag pattern. The electrodes VD and VG are connected to the respective impurity regions and receive an electrical signal that will correspond to the phase-shifted optical output signal LO. As illustrated in FIG. 1, the impurity regions may include a first impurity region 100 and a second impurity region 200. The first impurity region 100 connected to the first electrode VD is disposed in contact with the optical waveguide 300 at the first contact surface CP10 and includes the first charge carriers. The second impurity region 200 connected to the second electrode VG is disposed in contact with the optical waveguide 300 at the second contact surface CP20 and includes the second charge carriers. According to exemplary embodiments, one or both of the contact surfaces CP10 and CP20 may have a zigzag pattern along a propagation direction Z of the optical waveguide 300.

The impurity regions 100 and 200 may be disposed parallel to the propagation direction Z on both sides of the optical waveguide 300, and thus the contact surfaces CP10 and CP20 may be parallel to the propagation direction Z. Although the contact surfaces CP10 and CP20 are illustrated as dotted lines in FIG. 1, the contact surfaces CP10 and CP20 may have various zigzag patterns such as will be illustrated in FIG. 2A through FIG. 2G to increase the contact area of the contact surfaces CP10 and CP20. That is, at least one of the contact surfaces CP10 and CP20 may have a zigzag pattern rather than a flat pattern and thus may have a larger contact area with the optical waveguide 300 than a conventional, flat contact surface.

The respective densities of the charge carriers of the phase shifter 10 my be adjusted based on an electrical signal to change a phase of the optical output signal LO. The electrical signal may be a voltage signal that is applied between electrodes VD and VG. For example, the electrical signal may be a differential of signals applied to the respective electrodes VD and VG. Thus, an electric field may be formed in a first vertical direction X across the optical waveguide 300 based on the electrical signal. Accordingly, the densities of the first and second charge carriers of the phase shifter may change based on the voltage levels of the electrical signal.

Since the zigzag contact surfaces CP10 and CP20 illustrated in FIGS. 2A through 2H may have relatively larger area compared with flat contact surfaces of a conventional phase shifter, the movement of charge carriers between the optical wave guide 300 and each of the impurity regions 100 and 200 may increase. The movement of the charge carriers between the optical wave guide 300 and each of the impurity regions CP10 and CP20 may change densities of the first and second charge carriers. Accordingly, the densities of the charge carriers of the phase shifter 10 may be efficiently adjusted due to the relatively larger contact area of contact surfaces CP10 and CP20.

The optical signal LI may propagate through the optical waveguide 300 along various optical paths according to optical characteristics of the optical waveguide 300. The optical characteristics, such as a relative refraction ratio, may vary according to the densities of the charge carriers. When the optical signal LI passes though an optical waveguide 300 having a changed refraction ratio, the optical output signal LO may be phase shifted compared with an optical output signal passing through a normal optical waveguide with substantially no charge carriers. Thus, the phase shifter 10 may efficiently phase shift the optical output signal LO with respect to the phase of the optical signal LI, by applying an electrical signal through the electrodes VD and VG to vary the densities of the charge carriers in the impurity regions 100 and 200. Accordingly, the phase shifter 10 may efficiently control a phase difference between the phases of the optical signal LI and the optical output signal LO. For convenience of illustration, the phase shifter according to the exemplary embodiments will be referred to as a silicon phase shifter.

As described above, an electrical signal may be applied between the electrodes VD and VG to form the electric field across the optical waveguide 300 and thus to control the movement of the charge carriers between the optical wave guide 300 and each of the impurity regions. A further exemplary embodiment, described below with reference to FIG. 3B, includes three impurity regions, and the electrical signal may be applied between a third electrode formed on the third impurity region and both of the electrodes VG and VD.

The phase difference between the optical signals LI and LO is a function of the electrical signal. As the voltage of the electrical signal increases, the phase difference may increase. In contrast, as the voltage of the electrical signal decreases, the phase difference may decrease. The magnitude of the phase difference depends on the length L of the optical wave guide 300 as well as on the voltage level of the electrical signal. As the length L of the optical wave guide 300 increases, the optical signal LI takes longer to pass through the optical waveguide 300, and thus the phase difference may increase. As described above, zigzag contact surfaces CP10 and CP20 may increase the movement of charge carriers between the optical wave guide 300 and each of the impurity regions. Accordingly, a silicon phase shifter 10 with a shorter optical wave guide 300 may efficiently control the phase difference between the phases of the optical signal LI and the optical output signal LO. For example, a shorter silicon phase shifter 10 with zigzag patterned contact surfaces may have a performance substantially similar to a conventional, longer, silicon phase shifter having flat patterned contact surfaces.

A silicon phase shifter 10 according to an exemplary embodiment may efficiently vary the densities of the charge carriers based on the electrical signal applied through the electrodes VD and VG to change the optical characteristics of the optical wave guide 300 and thus may efficiently control the phase difference between the phases of the optical signals LI and LO.

FIGS. 2A through 2H are cross-sectional views illustrating examples of contact surfaces in the phase shifter of FIG. 1.

Figure 2A:
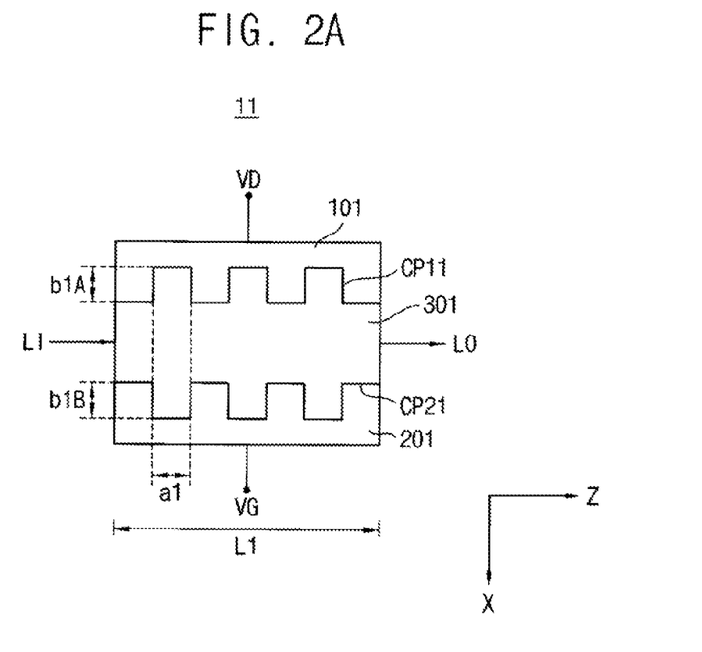
FIGS. 2A through 2H are cross-sectional views illustrating examples of contact surfaces in the phase shifter of FIG. 1.

Referring to FIG. 2A, a silicon phase shifter 11 includes an optical waveguide 301, a first impurity region 101, a second impurity region 201, the first electrode VD and the second electrode VG. The impurity regions 101 and 201 have respective contact surfaces CP11 and CP21 in contact with the optical waveguide 301. Each of the contact surfaces CP11 and CP21 may have zigzag patterns as illustrated in FIG. 2A.

In an exemplary embodiment, as illustrated in FIG. 2A, each of the first and second contact surfaces CP11 and CP21 may have zigzag patterns that are symmetric with respect to the optical waveguide 301. For example, the symmetrically formed zigzag patterns are square wave-like patterns along the propagation direction Z. In this case, a spatial phase difference between each of the square wave-like patterns may be about 180 degrees (i.e., π radians).

The area of the contact surfaces CP11 and CP21 may vary according to a first ratio of a height b1A to a width a1 and a second ratio of a height b1B to the width a1 of the respective square wave-like patterns. The ratios of the square wave-like patterns may be pre-determined based on the precision of a semiconductor manufacturing process. As the ratios increase, the area of the contact surfaces CP11 and CP21 increases per unit length. For example, when the ratio is 3, the area of the contact surfaces CP11 and CP21 may be about 4 times larger than the area of flat patterned contact surfaces of a conventional silicon phase shifter, where the lengths of the silicon phase shifters are substantially the same. In an exemplary embodiment, the first ratio and the second ratio may be substantially the same. In other exemplary embodiments, the first ratio and the second ratio may differ from each other.

Figure 2B:
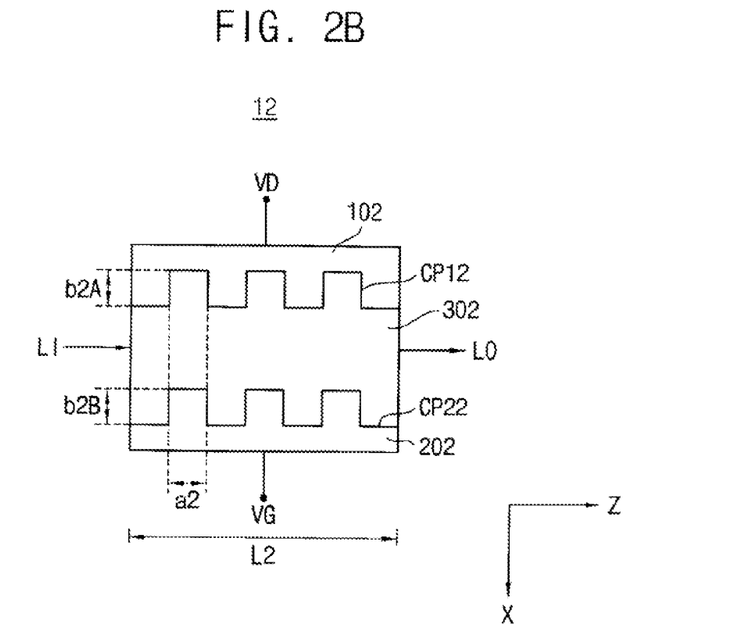

Referring to FIG. 2B, a silicon phase shifter 12 includes an optical waveguide 302, a first impurity region 102, a second impurity region 202, the first electrode VD and the second electrode VG. The impurity regions 102 and 202 respective contact surfaces CP12 and CP22 in contact with the optical waveguide 302. Each of the contact surfaces CP12 and CP22 may have other zigzag patterns as illustrated in FIG. 2B.

In an exemplary embodiment, as illustrated in FIG. 2B, each of the first and second contact surfaces CP12 and CP22 may have square wave-like zigzag patterns along the propagation direction Z of the optical waveguide 301. In this case, the square wave-like patterns of each of the first and second contact surfaces CP12 and CP22 may be substantially in phase with each other along the propagation direction Z. As illustrated in FIGS. 2B, 2D, 2E and 2G, when the spatial phases of the patterns are substantially in phase with each other, the optical waveguide 302 may have a substantially constant width along the propagation direction Z. In other exemplary embodiments, the contact surfaces CP12 and CP22 may have respective zigzag patterns (e.g., square wave-like patterns) having an arbitrary spatial phase difference.

The area of the contact surfaces CP12 and CP22 may vary according to a first ratio of a height b2A to a width a2 and a second ratio of a height b2B to the width a2 of the respective square wave-like patterns. As the ratios increase, the area of the contact surfaces CP12 and CP22 increases per a unit length of the optical wave guide 302. Thus, the area of the contact surfaces CP12 and CP22 may be larger than the area of flat patterned contact surfaces of the conventional silicon phase shifter, where the lengths of the optical wave guides are substantially the same. In an exemplary embodiment, the first ratio and the second ratio may be substantially the same. In other exemplary embodiments, the first ratio and the second ratio may differ from each other.

Figure 2C:
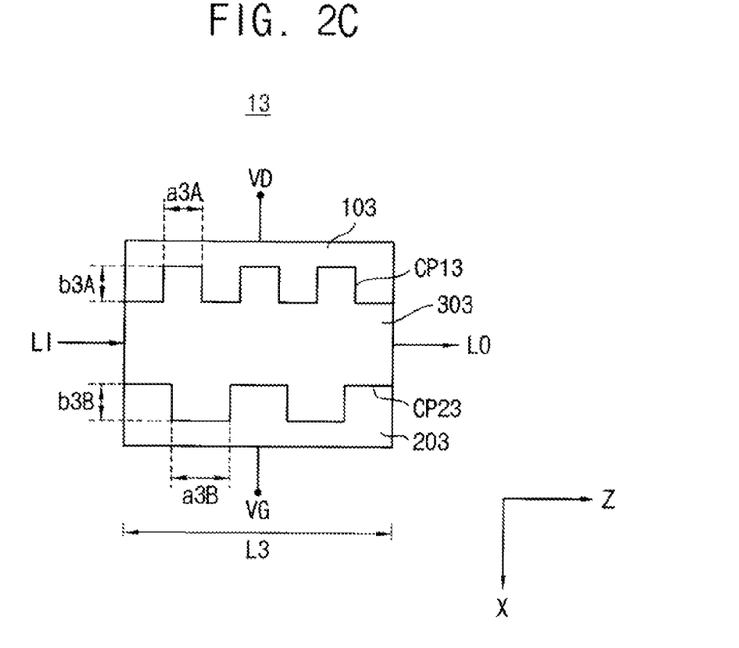

Referring to FIG. 2C, a silicon phase shifter 13 includes an optical waveguide 303, a first impurity region 103, a second impurity region 203, the first electrode VD and the second electrode VG. The impurity regions 103 and 203 have respective contact surfaces CP13 and CP23 in contact with the optical waveguide 303. Each of the contact surfaces CP13 and CP23 may have still other zigzag patterns as illustrated in FIG. 2C. The zigzag patterns in FIG. 2C may have different respective spatial frequencies. For example, the spatial period of a second zigzag pattern of the second contact surface CP23 may be greater than that of a first zigzag pattern of the first contact surface CP13, where the heights b3A and b3B are substantially the same. In this case, the first and second impurity regions 103 and 203 may have different charge carrier densities due to a mismatch of the contact surfaces CP13 and CP23 when the electrical signal is applied between the electrodes VD and VG.

In an exemplary embodiment, as illustrated in FIG. 2C, the zigzag patterns are square wave-like patterns along the propagation direction Z. In this case, as described above, the spatial frequencies of the square wave-like patterns may be substantially different from each other. In other exemplary embodiments, the contact surfaces CP13 and CP23 may have respective zigzag patterns (e.g., square wave-like patterns) having an arbitrary spatial frequency or wavelength differences.

The area of the contact surfaces CP13 and CP23 may vary according to a first ratio of a height b3A to a width a3 and a second ratio of a height b3B to the width a3 of the respective square wave-like patterns. As the ratios increase, the area of the contact surfaces CP13 and CP23 increases per unit length of the optical wave guides. Thus, the area of the contact surfaces CP13 and CP23 may be greater than the area of a flat patterned contact surface of a conventional silicon phase shifter, where the lengths of the silicon phase shifters are substantially the same. In an exemplary embodiment, the first ratio and the second ratio may be substantially the same. In other exemplary embodiments, the first ratio and the second ratio may differ from each other.

Referring again to FIGS. 2A, 2B and 2C, each of the zigzag patterns of the contact surfaces CP11, CP12, CP13, CP21, CP22 and CP23 may include first planes and second planes that connect at edges. The first planes may be parallel to a propagation direction Z of the optical waveguide. The second planes may be perpendicular to the propagation direction Z (i.e., parallel to the first vertical direction X).

Figure 2D:
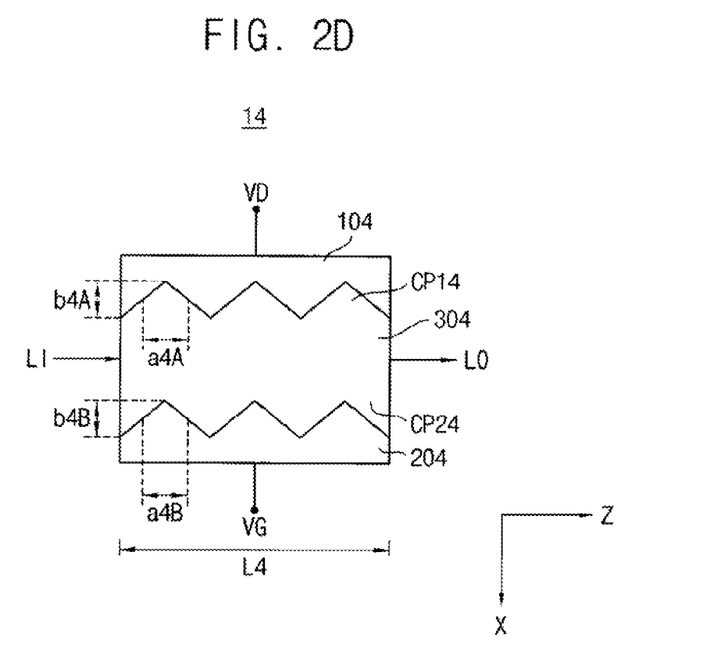

Referring to FIG. 2D, a silicon phase shifter 14 includes an optical waveguide 304, a first impurity region 104, a second impurity region 204, the first electrode VD and the second electrode VG. The first and second contact surfaces CP14 and CP24 may have triangular wave-like zigzag patterns in contact with the optical waveguide 304 along the propagation direction Z. In this case, spatial phases of the triangular wave-like patterns may be substantially in phase along the propagation direction Z, and thus the optical waveguide 304 may have a substantially constant width along the propagation direction Z when heights b4A and b4B of the zigzag patterns are substantially the same. In other exemplary embodiments, the contact surfaces CP14 and CP24 may have respective zigzag patterns (e.g., triangular wave-like patterns) with an arbitrary spatial phase difference. According to other exemplary embodiments, the contact surfaces CP14 and CP24 may have respective zigzag patterns (e.g., triangular wave-like patterns) with arbitrary spatial frequency or wavelength differences.

The area of the contact surfaces CP14 and CP24 may vary according to a first ratio of the height b4A to a width a4 and a second ratio of the height b4B to the width a4 of the respective triangular wave-like patterns. In an exemplary embodiment, the first ratio and the second ratio may be substantially the same. In other exemplary embodiments, the first ratio and the second ratio may differ from each other.

Figure 2E:
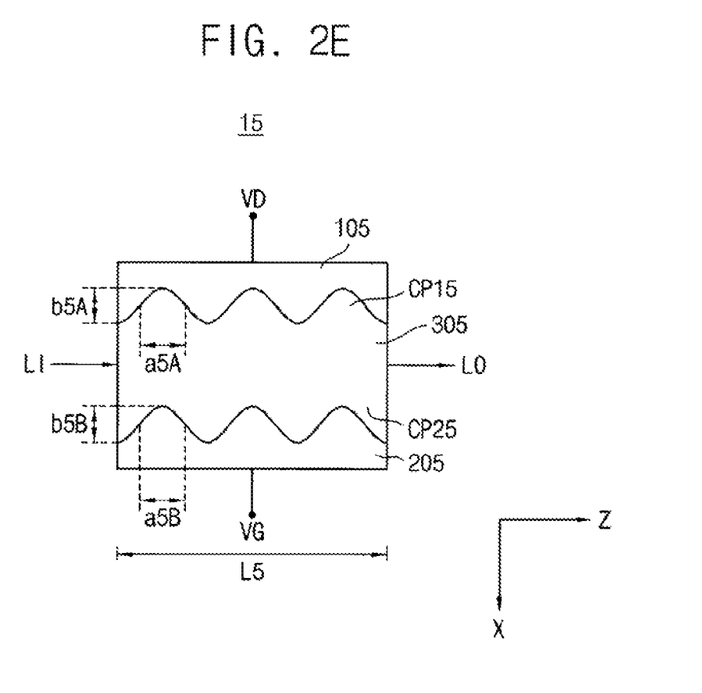

Referring to FIG. 2E, a silicon phase shifter 15 includes an optical waveguide 305, a first impurity region 105, a second impurity region 205, the first electrode VD and the second electrode VG. The first and second contact surfaces CP15 and CP25 may have respective sine wave-like zigzag patterns in contact with the optical waveguide 305 along the propagation direction Z. In this case, the sine wave-like patterns may be substantially in phase along the propagation direction Z, and thus the optical waveguide 305 may have a substantially constant width along the propagation direction Z when heights b5A and b5B of the zigzag patterns are substantially the same. In other exemplary embodiments, the contact surfaces CP15 and CP25 may have respective zigzag patterns (e.g., sine wave-like patterns) with an arbitrary spatial phase difference. According to other exemplary embodiments, the contact surfaces CP15 and CP25 may have respective zigzag patterns (e.g., sine wave-like patterns) with an arbitrary spatial frequency or wavelength difference. According to other exemplary embodiments, the contact surfaces CP15 and CP25 may have respective zigzag patterns with an arbitrary curve repeated periodically.

The area of the contact surfaces CP15 and CP25 may vary according to a first ratio of the height b5A to a width a5 and a second ratio of the height b5B to the width a5 of the respective sine wave-like patterns. In an exemplary embodiment, the first ratio and the second ratio may be substantially the same. In other exemplary embodiments, the first ratio and the second ratio may be different to each other.

Figure 2F:
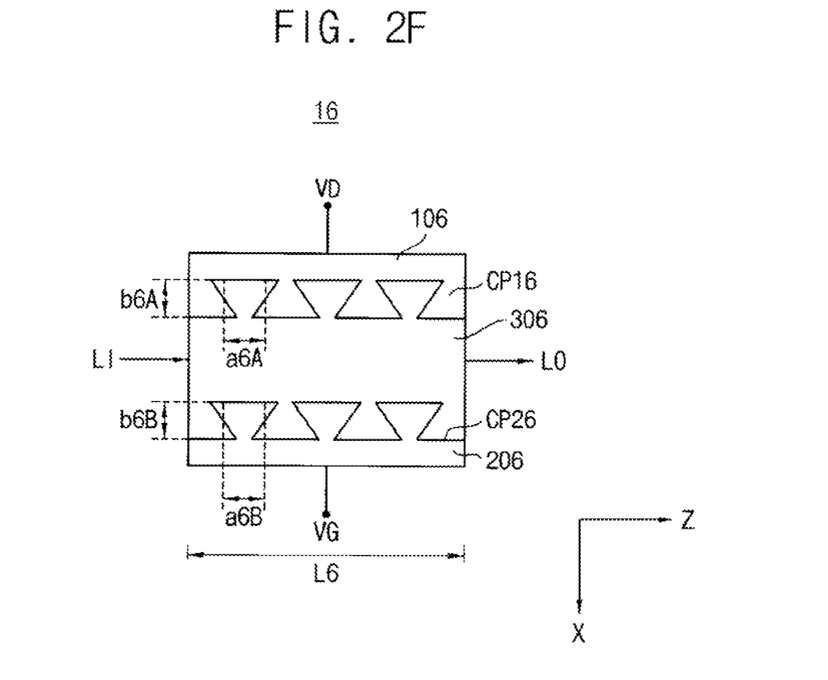
Figure 2G:
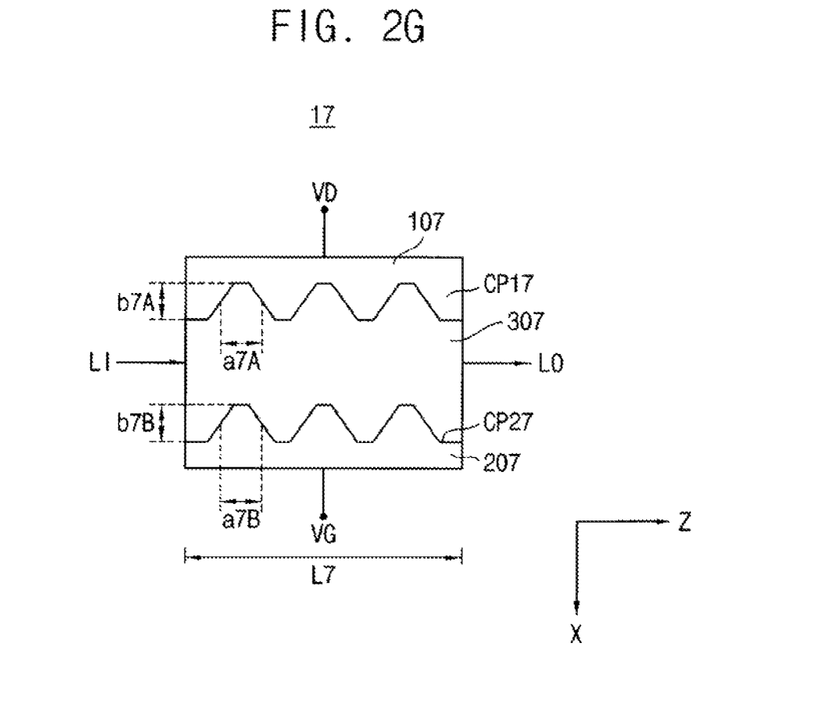
Figure 2H:
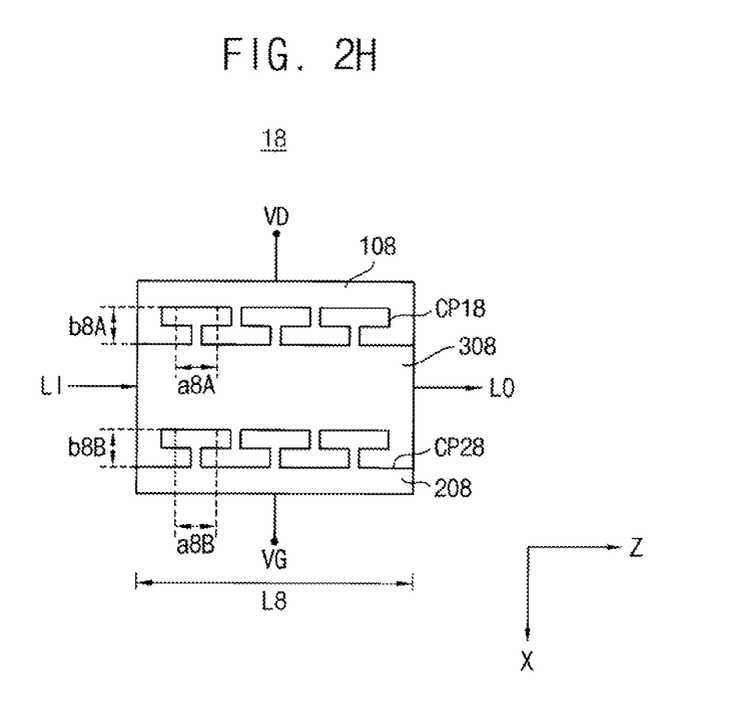

In FIGS. 2F, 2G, and 2H, below, silicon phase shifters 16, 17 and 18 have optical waveguides 306, 307 and 308, first impurity regions 106, 107 and 108, and second impurity regions 206, 207, and 208, that are substantially similar to the corresponding parts of the silicon phase shifters of FIGS. 2A to 2E, thus any repeated description will be omitted. Referring to FIGS. 2F and 2G, first and second contact surfaces CP16, CP17, CP26 and CP27 may have respective trapezoidal wave-like zigzag patterns in contact with the optical waveguide 306 or 307 along the propagation direction Z. According to other exemplary embodiments, the contact surfaces CP16, CP17, CP26 and CP27 may be formed to have respective zigzag patterns having an arbitrary quadrangular shape that is periodically repeated.

The area of the contact surfaces CP16 (or CP17) and CP26 (or CP27) may vary according to a first ratio of a height b6A (or b7A) to a width a6A (or a7A) and a second ratio of a height b6B (or b7B) to the width a6B (or a7B) of the respective trapezoidal wave-like patterns. In an exemplary embodiment, the first ratio and the second ratio may be substantially the same. In other exemplary embodiments, the first ratio and the second ratio may be different to each other.

Referring to FIG. 2H, the first and second contact surfaces CP18 and CP28 may have respective polygonal wave-like zigzag patterns in contact with the optical waveguide 308 along the propagation direction Z. The shapes of the polygonal wave-like patterns may be pre-determined based on the precision of the semiconductor manufacturing process.

As described with reference to FIGS. 2A through 2H, the widths of the zigzag patterns of contact surfaces CP11 through CP28 may correspond to a half period when the zigzag patterns are periodic. The widths may range from about 0.0055 um to about 1 um, based on the semiconductor manufacturing processes. The ratio of height to width of each zigzag pattern in FIGS. 2A through 2H may range from about 0.1 to about 100, based on the semiconductor manufacturing processes. The silicon phase shifters 11 through 18 are similar to each other except for the shapes of the zigzag patterns of the contact surfaces CP11 through CP28, and thus a repeated description will be omitted.

Figure 3A:
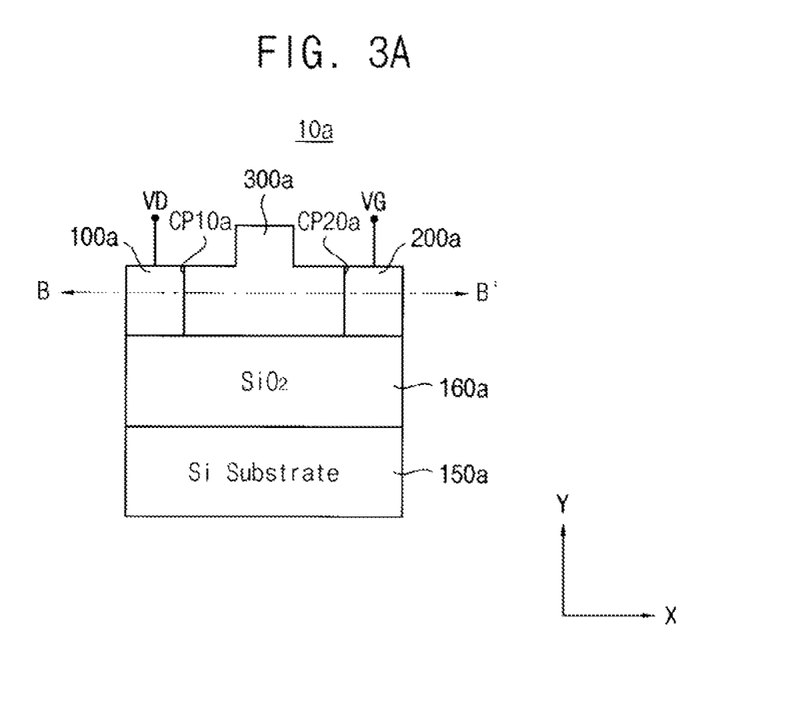
FIGS. 3A and 3B are vertical cross-sectional views illustrating examples of the phase shifter of FIG. 1.
Figure 3B:
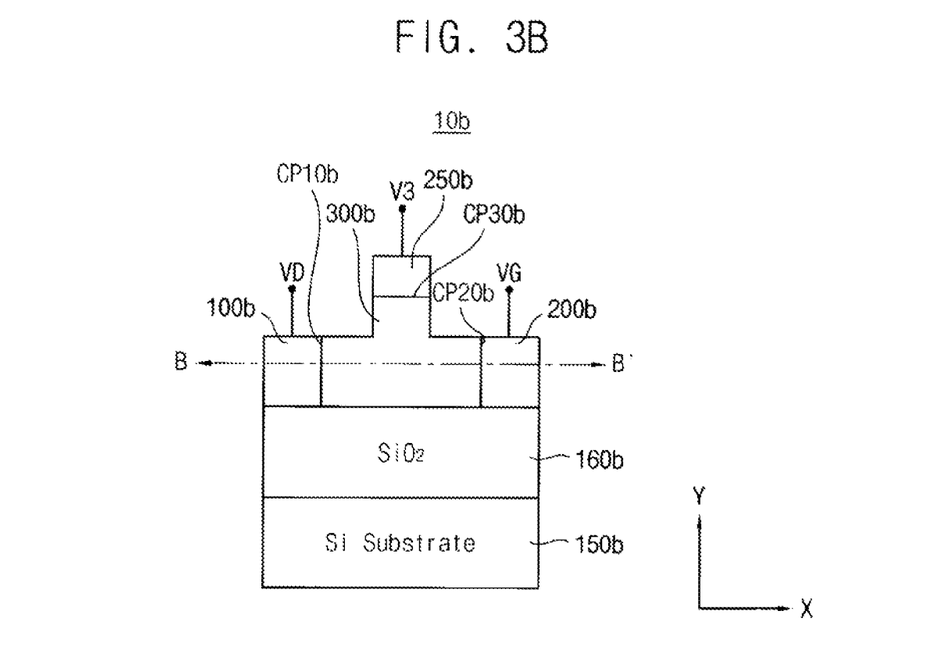

FIGS. 3A and 3B are vertical cross-sectional views illustrating examples of the phase shifter of FIG. 1. FIG. 3A illustrates a vertical cross-section A-A' in FIG. 1 when the silicon phase shifter 10a includes two impurity regions 100a and 200a. FIG. 3B illustrates another vertical cross-section A-A' in FIG. 1 when the silicon phase shifter 10b includes three impurity regions 100b, 200b and 250b.

Referring to FIG. 3A, the silicon phase shifter 10a includes the optical waveguide 300a, the first impurity region 100a, the second impurity region 200a, the first electrode VD and the second electrode VG, an insulation layer 160a and a silicon layer 150a. The optical waveguide 300a receives the optical signal LI and outputs the optical output signal LO, along the propagation direction Z of FIG. 1 perpendicular to directions X and Y. The first impurity region 100a includes first charge carriers and is disposed in contact with optical waveguide 300a at contact surface CP10a between the first impurity region 100a and the optical waveguide 300a. The first impurity region 100a may be connected to the first electrode VD. The second impurity region 200a includes second charge carriers and is disposed in contact with optical waveguide 300a at contact surface CP20a between the second impurity region 200a and the optical waveguide 300a. The second impurity region 200a may be connected to the second electrode VG. At least one of the contact surfaces CP10a and CP20a has a zigzag pattern between the corresponding impurity region and the optical waveguide 300a. In an exemplary embodiment, as described with reference to FIGS. 2A through 2H, the contact surfaces CP10a and CP20a may have various zigzag patterns. In other exemplary embodiments, one of the contact surfaces CP10a and CP20a may have a flat pattern.

The optical waveguide 300a and the impurity regions 100a and 200a may be formed on a silicon-on-insulator (SOI) substrate or a bulk silicon substrate. When the optical waveguide 300a and the impurity regions 100a and 200a are formed on an SOI substrate, the optical waveguide 300a and the impurity regions 100a and 200a may be formed on the insulation layer 160a that is formed on the silicon layer 150a, as illustrated in FIG. 3A. A thickness of the impurity regions 100a and 200a may relate to a transmission loss of the optical signal LI, where the thickness is measured in a second vertical direction Y. Thus, the impurity regions 100a and 200a may be relatively thin to reduce transmission loss of the optical signal LI.

The impurity regions 100a and 200a may be formed on the insulation layer 160a on both sides of the optical waveguide 300a. In an exemplary embodiment, as illustrated in FIG. 3A, the impurity regions 100a and 200a may be faulted directly on the insulation layer 160a. In other exemplary embodiments, although not illustrated, the optical waveguide 300a may include a relatively thin layer between the insulation layer 160a and at least one of the impurity regions 100a and 200a. Thus, the impurity regions 100a and 200a may be formed indirectly on the insulation layer 160a on both sides of the optical waveguide 300a.

In an exemplary embodiment, based on the dopants in the impurity regions 100a and 200a, the first charge carriers may be electrons and the second charge carriers may be electron holes. In this case, for example, the first impurity region 100a may be doped with phosphorus and the second impurity region 200a may be doped with boron.

Referring to FIG. 3B, the silicon phase shifter 10b includes the optical waveguide 300b, the first impurity region 100b, the second impurity region 200b, a third impurity region 250b, the first electrode VD and the second electrode VG, the insulation layer 160b and the silicon layer 150b. The optical waveguide 300b transmits the optical signal LI in the propagation direction Z of FIG. 1, perpendicular to directions X and Y. The impurity regions 100b, 200b and 300b have respective contact surfaces CP10b, CP20b and CP30b in contact with the optical waveguide 300b. At least one of the contact surfaces CP10b, CP20b and CP30b has a zigzag pattern between the corresponding impurity region and the optical waveguide 300b. The optical waveguide 300b and the impurity regions 100b, 200b and 250b may be disposed on the insulation layer 160b that is disposed on the silicon layer 150b, as illustrated in FIG. 3B.

The first impurity region 100b may have the first contact surface CP10b in contact with the optical waveguide 300b and may have the first charge carriers. The second impurity region 200b may have the second contact surface CP20b in contact with the optical waveguide 300b and may have the second charge carriers. Further, the third impurity region 250b may have the third contact surface CP30b in contact with the optical waveguide 300b and may have third charge carriers. The third contact surface CP30b may be separated from the first and second contact surfaces CP10b and CP20b. For example, the third contact surface CP30b may be disposed on the optical waveguide 300b and spaced apart from the first and second contact surfaces CP10b and CP20b, as illustrated in FIG. 3B. Examples of cross sectional views of cross section B-B' are illustrated in FIGS. 2A through 2H, and thus a repeated description will be omitted.

The first and second impurity regions 100b and 200b may be connected to the first and second electrodes VD and VG, respectively. The third impurity region 250b may be connected to a third electrode V3. In this case, two of the three electrodes VD, VG and V3 may be coupled to receive a common voltage signal.

In an exemplary embodiment, the first and second charge carriers may have a first conduction type and the third charge carrier may have a second conduction type opposite to the first conduction type. For example, the first and second charge carriers may be electrons and the third charge carriers may be electron holes. In this case, the electric signal may be applied between the third impurity region 250b and both of the first and second impurity regions 100b and 200b. Thus, the electric field, along which the electrons and the electron holes in the impurity regions move, may be formed based on the electric signal. As described with reference to FIG. 1, the densities of the charge carriers may vary according to their movements. The silicon phase shifter 10b according to exemplary embodiments may efficiently change the optical characteristics of the optical wave guide 300b by varying the densities of the charge carriers based on electrical signals applied through the electrodes VD, VG and V3 and thus may efficiently change the phase differences between the optical signals LI and LO passing through the optical waveguide 300b.

The silicon phase shifter 10b is similar to the silicon phase shifter 10a, except that the silicon phase shifter 10b further includes the third impurity region 250b, and thus a repeated description will be omitted.

Figure 4:
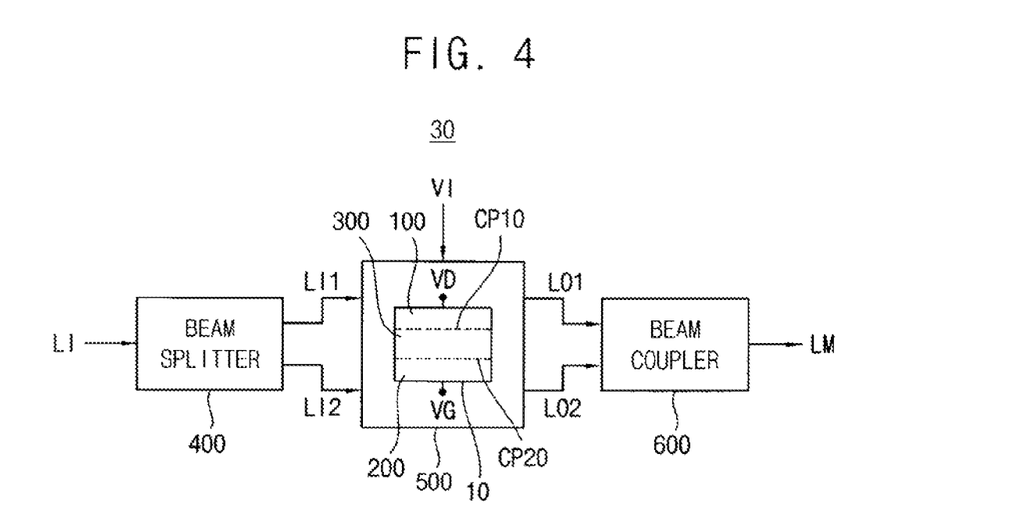
FIG. 4 is a block diagram illustrating an electro-optic modulation device according to some exemplary embodiments.

FIG. 4 is a block diagram illustrating an electro-optic modulation device according to some exemplary embodiments.

Referring to FIG. 4, an electro-optic modulation device 30 includes a beam splitter 400, a phase shifting unit 500 and a beam coupler 600.

The beam splitter 400 divides an input optical signal LS into a first optical signal LI1 and a second optical signal LI2. The phase shifting unit 500 includes at least one phase shifter 10. The phase shifting unit 500 phase shifts at least one of the first optical signal LI1 and second optical signal LI2 based on the electrical signal VI to output a third optical signal LO1 and a fourth optical signal LO2. Although only one phase shifter is illustrated in FIG. 4 for convenience of illustration, the phase shifting unit 500 may include more than one phase shifter. The phase shifter 10 includes the optical waveguide 300 and the plurality of impurity regions 100 and 200. The optical waveguide 300 receives one of the divided optical signals LI1 and LI2 to output a phase-shifted optical signal (i.e., at least one of the third and fourth optical signals LO1 and LO2). The impurity regions 100 and 200 include respective charge carriers. The impurity regions 100 and 200 are disposed in contact with the optical wave guide 300 at respective contact surfaces CP10 and CP20, where at least one of the contact surfaces CP10 and CP20 has a zigzag pattern. The electrodes VG and VD are connected to the respective impurity regions 100 and 200 and are applied with the electrical signal VI that causes the phase-shifts in the optical signal (i.e., at least one of the third and fourth optical signals LO1 and LO2). The beam coupler 600 generates a modulated optical signal LM based on the third and fourth optical signals LO1 and LO2.

The electro-optic modulation device 30 may further include a first optical waveguide unit (not shown) located between the beam splitter 400 and the phase shifting unit 500 and a second optical waveguide unit (not shown) located between the phase shifting unit 500 and the beam coupler 600. Each of the optical waveguide units may include two optical waveguides transmitting the respective optical signals, such as first and second optical signals LI1 and LI2 or third and fourth optical signals LO1 and LO2.

As described above, an electro-optic modulation device 30 may transmit data using optical signals by modulating the optical signals based on the data. The modulation of the optical signals may generally include a splitting step, a phase-shifting step and a combining step.

The beam splitter 400 may split the optical signal LI into two optical signals LI1 and LI2 and may provide optical signals LI1 and LI2 to the phase shifting unit 500. After the splitting step, the optical signals LI1 and LI2 may have substantially the same phase. The phase shifting unit 500 may change a phase of at least one of the optical signals LI1 and LI2 based on the electrical signal VI that represents the data to be transmitted through the electro-optic modulation device 30. As described above, the phase shifting unit 500 may change the optical characteristics of the optical waveguide 300 in the phase shifter 10 by applying the electrical signal VI between the impurity regions 100 and 200, thus shifting the phase of optical signal passing through the optical waveguide 300 according to the changed optical characteristics. The phase shifting unit 500 may cause a phase difference between at least one of the optical signals LI1 and LI2 and a corresponding optical signal LO1 or LO2 based on the applied electrical signal VI. The phase shifting unit 500 may provide the optical signals LO1 and LO2 to the beam coupler 600.

The beam coupler 600 may output the modulated optical signal LM by combining or coupling the optical signals LO1 and LO2, where the amplitude (or power) of the modulated optical signal LM corresponds to the data. When the optical signals LO1 and LO2 have a phase difference of about 180 degrees, destructive interference between the optical signals LO1 and LO2 occurs and the optical signals LO1 and LO2 substantially cancel each other. Accordingly, the amplitude of the modulated optical signal LM may be about zero. On the contrary, when the optical signals LO1 and LO2 have a phase difference of about 0 degree or are substantially in phase with each other, constructive interference between the optical signals LO1 and LO2 occurs and the optical signals LO1 and LO2 amplify each other. In this case, the amplitude of the modulated optical signal LM may relatively increase. Moreover, when the optical signals LO1 and LO2 have a phase difference between about 0 to about 180 degrees, the modulated optical signal LM may have an amplitude between the amplitude of the destructive interference and the amplitude of the constructive interference.

In the case of constructive interference, the amplitude of the modulated optical signal LM may be larger or smaller than each of amplitudes of the optical signals LO1 and LO2 according to a coupling efficiency of the beam coupler 600. For example, the amplitude of the modulated optical signal LM may decrease when the coupling efficiency decreases. On the other hand, the amplitude of the modulated optical signal LM may increase when the coupling efficiency increases.

As described above, the amplitude of the modulated optical signal LM may correspond to the data. For example, when the amplitude of the modulated optical signal LM is about 0, a corresponding data to be transmitted is a first logic level (e.g., logic low '0'). In contrast, when the amplitude of the modulated optical signal LM is above a pre-determined level, a corresponding data to be transmitted is a second logic level (e.g., logic high '1').

As describe with reference to FIGS. 3A and 3B, the phase shifter 10 may be formed on a silicon substrate. Furthermore, the components 400, 500 and 600 of the electro-optic modulator 30 may be formed on the same silicon substrate. Thus, the electro-optic modulator 30 may be implemented using a single silicon substrate. In some exemplary embodiments, the electro-optic modulator 30 may be formed on a SOI substrate or a bulk silicon substrate. For convenience of explanation, the phase shifter 10 is assumed to be formed on the silicon substrate and thus the phase shifter 10 will be referred to as a silicon phase shifter.

In general, electrical interconnection paths using conductive materials such as metal and copper are widely used to interconnect electronic components. However, since a data rate (i.e., transmission capacity) of the interconnection paths may be restricted due to electromagnetic interference (EMI), impedance mismatches and other interferences, photonic interconnection technology has been used to interconnect the electronic components. Photonic interconnection paths may be used among the electronic components that require relatively high data rates. The electronic components and the photonic interconnection paths may be integrated in a photonic integrated circuit (PIC). A silicon-based photonic communication technology may be referred to as silicon photonics. The silicon PIC needs to use electro-optic modulators based on silicon to interconnect the electronic components using the photonic interconnection paths.

In general, electro-optic modulators may be categorized as either electro absorption optical modulators or electro interference optical modulators. An electro interference optical modulator modulates optical signals using constructive or destructive inference between two combined optical signals, at least of which is phase shifted. An electro interference optical modulator may be referred to as a Mach-Zehnder interferometer type optical modulator. As opposed to other types of electro interference optical modulators, such as Lithium Niobate (e.g., LiNbO3) optical modulators, silicon electro interference optical modulators may be formed on silicon substrates, and thus can be integrated on the same substrate as the PIC. The degree of integration of the PIC may depend on the modulation efficiency of the silicon electro interference optical modulators, which indicates the capability of phase shifting the optical signal.

Silicon electro-optic modulators include regions in which charge carrier density may be varied according to electrical signals received from an external electrical device. The refraction ratio of the optical waveguide located between the regions can be varied due to influent or effluent charge carriers. Thus the silicon electro-optic modulators may control the phase of optical signals passing through the optical waveguide through the application of electrical signals to the regions.

The electro-optic modulation device 30 according to exemplary embodiments may efficiently vary the densities of the charge carriers based on the electrical signal VI to change the optical characteristics of the optical wave guide 300 and thus may efficiently vary the phase difference between the optical signals LI and LO passing through the optical waveguide 300. The electro-optic modulation device 30 includes the silicon phase shifter 10 having the impurity regions 100 and 200 with respective zigzag patterned contact surfaces CP10 and CP2 in contact with the optical waveguide 300. Accordingly, the electro-optic modulation device 30 may generate the modulated optical signal LM based on the electrical signal VI by efficiently varying the phases of the optical signals passing through the optical waveguide 300.

As described above, since the zigzag pattern of at least one of the contact surfaces CP10 and CP20 relatively increases the movement of the charge carriers between the optical waveguide 300 and at least one of impurity regions 100 and 200, a shorter silicon phase shifter 10 of the electro-optic modulation device 30 may efficiently vary the phase difference between the phases of the optical signal LI and the optical output signal LO. For example, the electro-optic modulation device 30 including the relatively short silicon phase shifter 10 with zigzag contact surface patterns may have performance similar to a longer conventional silicon phase shifter having flat contact surface patterns.

Figure 5:
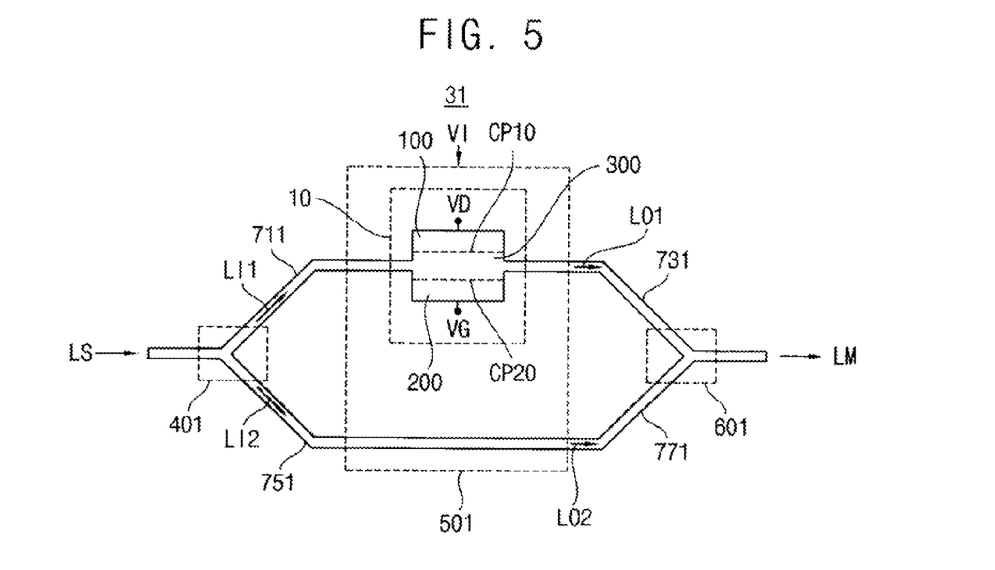
FIG. 5 is a cross-sectional view illustrating an example of the electro-optic modulation device of FIG. 4.

FIG. 5 is a cross-sectional view illustrating an example of the electro-optic modulation device of FIG. 4.

Referring to FIG. 5, an electro-optic modulation device 31 includes a beam splitter 401, a phase shifting unit 501 and a beam coupler 601.

The beam splitter 401 divides the input optical signal LS into the first optical signal LI1 and the second optical signal LI2 that has substantially the same phase. The beam splitter 401 may transmit the first optical signal LI1 and the second optical signal LI2 through the respective optical paths 711 and 751 to the phase shifting unit 501.

The phase shifting unit 501 may include a silicon phase shifter 10 that performs phase shifting operation on the first optical signal LI1 based on the electrical signal VI to output the third optical signal L01. The phase shifting unit 501 may output the second optical signal LI2 as the fourth optical signal LO2 without shifting the phase. The phase shifter 10 may vary the phase of the third optical signal LO1 based on the electrical signal VI that represents the data being transmitted through the electro-optic modulation device 31. As described above, the phase shifting unit 501 may change the optical characteristics of the optical waveguide 300 in the silicon phase shifter 10 by applying the electrical signal VI between the impurity regions 100 and 200, and thus shifting the phase of the optical signal passing through the optical waveguide 300 according to the changed optical characteristics. The phase shifting unit 501 may vary a phase difference between the first optical signal L11 and the third optical signal LO1 based on the applied electrical signal VI. The phase shifting unit 501 may transmit the third optical signal LO1 and fourth optical signal LO2 through the respective optical path 731 and 771 to the beam coupler 601.

The beam coupler 601 may output the modulated optical signal LM by combining or coupling the optical signals LO1 and LO2, where the amplitude (or power) of the modulated optical signal LM corresponds to the data. When the phase shifting unit 501 shifts the phase of the first optical signal LI1 by about 180 degrees to output the third optical signal LO1, the phase difference between the optical signals LO1 and LO2 is about 180 degrees. Thus destructive interference occurs in which the optical signals LO1 and LO2 substantially cancel each other. Accordingly, in this case, the amplitude of the modulated optical signal LM may be about zero. On the contrary, when the phase shifting unit 501 shifts the phase of the first optical signal LI1 by about 0 degrees to output the third optical signal LO1, the phase difference between the optical signals LO1 and LO2 is about 0 degrees. Thus constructive interference occurs in which the optical signals LO1 and LO2 amplify each other. In this case, the amplitude of the modulated optical signal LM may relatively increase. Moreover, when the optical signals LO1 and LO2 have a phase difference between about 0 to about 180 degrees, the modulated optical signal LM may have an amplitude between the amplitude of the destructive interference and the amplitude of the constructive interference.

In an exemplary embodiment, the optical paths 711, 731, 751 and 771 may be formed on the same silicon substrate where the phase shifting unit 501, the beam splitter 401 and the beam coupler 601 are formed. In other exemplary embodiments, when the phase shifting unit 501, the beam splitter 401 and the beam coupler 601 are formed on respective silicon substrates, the optical paths 711, 731, 751 and 771 may be implemented independently from the respective silicon substrates. For example, the optical paths 711, 731, 751 and 771 may be implemented as dielectric slab waveguides, strip waveguides, optical fibers, etc.

Figure 6:
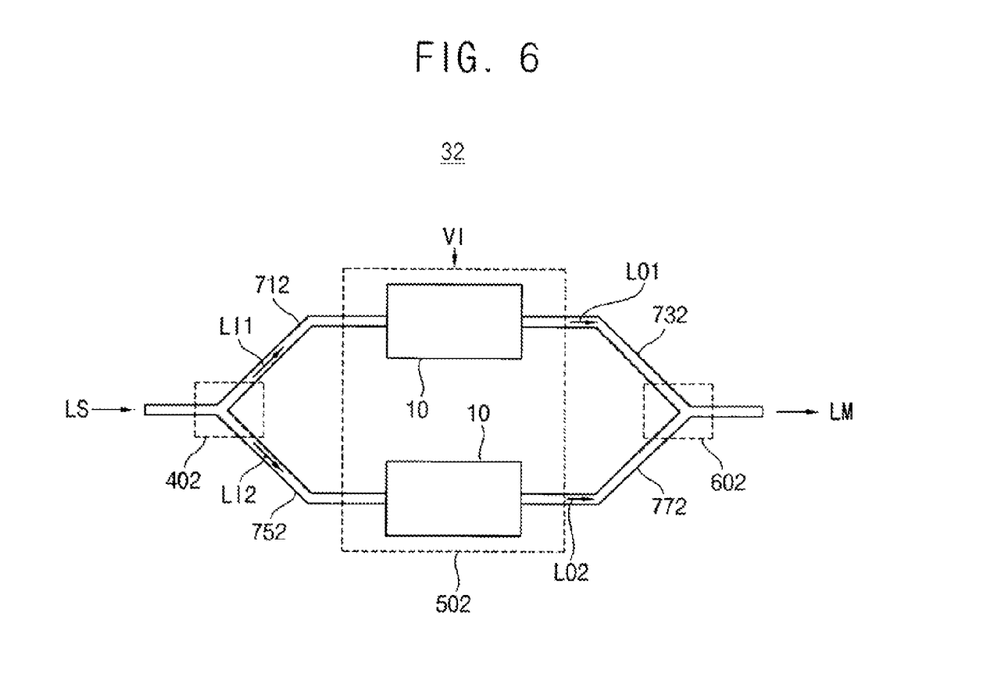
FIG. 6 is a cross-sectional view illustrating another example of the electro-optic modulation device of FIG. 4.

FIG. 6 is a cross-sectional view illustrating another example of the electro-optic modulation device of FIG. 4.

Referring to FIG. 6, an electro-optic modulation device 32 includes a beam splitter 402, a phase shifting unit 502 and a beam coupler 602.

The beam splitter 402 divides the input optical signal LS into the first optical signal LI1 and the second optical signal LI2 with substantially the same phase. The beam splitter 402 may transmit the first optical signal LI1 and the second optical signal LI2 through the respective optical paths 712 and 752 to the phase shifting unit 502.

The phase shifting unit 502 may include two silicon phase shifters 10. The silicon phase shifters phase shift the respective optical signals LI1 and LI2 based on the electrical signal VI to output the respective optical signals LO1 and LO2. The phase shifters 10 of the phase shifting unit 502 may vary the phases of the respective optical signals LO1 and LO2 based on two respective phase control signals corresponding to the electrical signal VI that represents the data being transmitted through the electro-optic modulation device 32. In an exemplary embodiment, the first phase control signal may be the same as the electrical signal VI and the second phase control signal may be an inverted signal of the electrical signal VI. As described above, the phase shifting unit 502 may change the optical characteristics of the respective optical waveguides 300 in the silicon phase shifters 10 by applying the two respective phase control signals between the impurity regions 100 and 200, and thus shifting each phase of the optical signals passing through the respective optical waveguides 300 according to the changed optical characteristics. The phase shifting unit 502 may vary the first phase difference between the first optical signal LI1 and the third optical signal LO1 and the second phase difference the second optical signal LI2 and the fourth optical signal LO2, based on the applied electrical signal VI. In an exemplary embodiment, the second phase difference has the same magnitude but an opposite sign (i.e., negative or positive) with respect to the first phase difference. The phase shifting unit 502 may transmit the third and fourth optical signals LO1 and LO2 through the respective optical path 732 and 772 to the beam coupler 602.

The beam coupler 602 may output the modulated optical signal LM by combining or coupling the optical signals LO1 and LO2, where amplitude (or power) of the modulated optical signal LM corresponds to the data. If the phase shifting unit 502 shifts the phase of the first optical signal LI1 by about 90 degrees to output the third optical signal LO1 and shifts the phase of the second optical signal LI2 by about −90 degrees to output the fourth optical signal LO2, the phase difference between the optical signals LO1 and LO2 is about 180 degrees. Thus destructive interference occurs and the optical signals LO1 and LO2 substantially cancel each other. Accordingly, in this case, the amplitude of the modulated optical signal LM may be about zero. On the contrary, if the phase shifting unit 502 shifts the phases of the optical signals LI1 and LI2 by about 0 degrees to output the respective optical signals LO1 and LO2, the phase difference between the optical signals LO1 and LO2 is about 0 degrees. Thus constructive interference occurs so that the optical signals LO1 and LO2 amplify each other. In this case, the amplitude of the modulated optical signal LM may increase. Moreover, when the optical signals LO1 and LO2 have a phase difference between about 0 to about 180 degrees, the modulated optical signal LM may have an amplitude between the amplitude of the destructive interference and the amplitude of the constructive interference.

The electro-optic modulation device 32 is similar to the electro-optic modulation device 31 except that the phase shifting unit 502 includes two silicon phase shifters for the respective optical signals LO1 and LO2. Thus a repeated description will be omitted.

Figure 7:
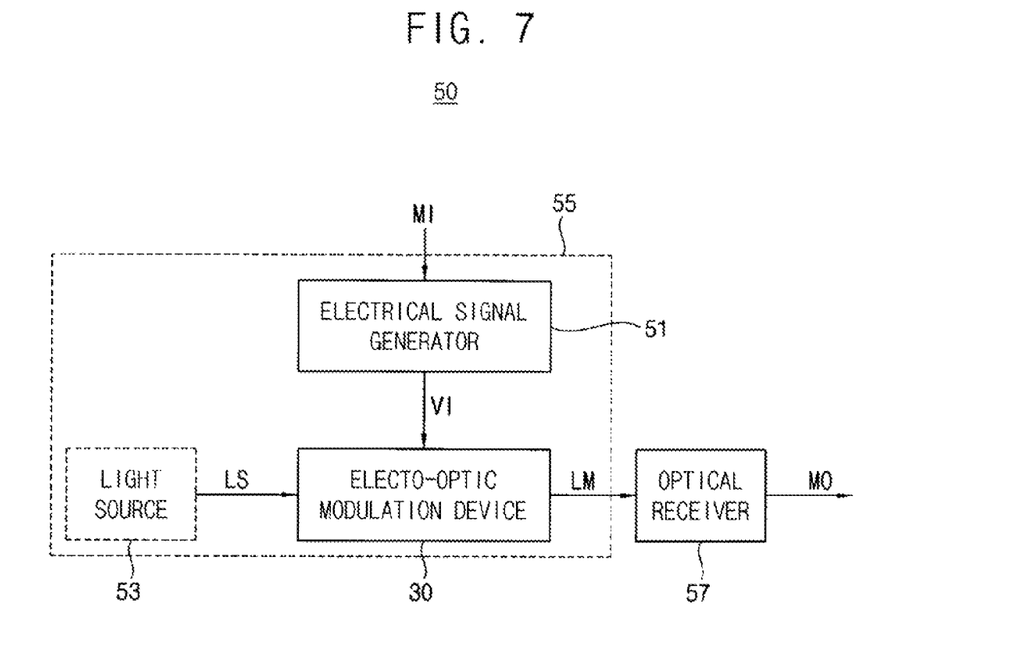
FIG. 7 is a block diagram illustrating a photonic integrated circuit according to some exemplary embodiments.

FIG. 7 is a block diagram illustrating a photonic integrated circuit according to some exemplary embodiments.

Referring to FIG. 7, a photonic integrated circuit 50 includes an electro-optic modulation unit 55 and an optical receiver 57.

The electro-optic modulation unit 55 includes an electric signal generator 51 and the electro-optic modulation device 30. The electric signal generator 51 generates the electrical signal VI based on a transmission data signal MI. The electric signal generator 51 may receive the transmission data signal MI from an external device and may convert the transmission data signal MI into the electrical signal VI that will be used to phase shift the input optical signal LS. The voltage of the electrical signal VI may vary as a function of the modulation efficiency of the electro-optic modulation device 30 or as a function of a reference voltage related to the voltage required for a silicon phase shifter to shift the optical signal by 180 degrees. The reference voltage may vary according to configuration of the silicon phase shifter. For example, the silicon phase shifter 10b illustrated in FIG. 3B may have a different reference voltage with respect to the silicon phase shifter 10a illustrated in FIG. 3A because of the different arrangement of impurity regions in the two silicon phase shifters 10a and 10b.

The electro-optic modulation device 30 transforms the input optical signal LS into the modulated optical signal LM based on the electrical signal VI. The electro-optic modulation device 30 may include at least one silicon phase shifter. Each of the at least one phase shifters includes the optical waveguide 300 and the impurity regions 100 and 200. The impurity regions 100 and 200, which include the respective charge carriers, are disposed in contact with the optical waveguide 300 at respective contact surfaces CP10 and CP20, where at least one of the contact surfaces CP10 and CP20 has a zigzag pattern between the corresponding impurity region and the optical waveguide 300. The electro-optic modulation device 30 divides the input optical signal LS into the first optical signal LI1 and the second optical signal LI2. At least one phase shifter changes a phase of at least one of the optical signals LO1 and LO2 based on the electrical signal VI. The electro-optic modulation device 30 generates the modulated optical signal LM based on the third optical signal LO1 and the fourth optical signal LO2. The electro-optic modulation device 30 in FIG. 7 is similar to the electro-optic modulation device 30 in FIG. 4, and thus a repeated description will be omitted.

In an exemplary embodiment, the electro-optic modulation unit 55 may further include a light source 53. The light source 53 generates the input optical signal LS and provides the input optical signal LS to the electro-optic modulation device 30. The light source 53 may be implemented in the same substrate where the electro-optic modulation device 30 is formed, or in an independent substrate. In other exemplary embodiments, the light source 53 may be included in an external device.

The optical receiver 57 generates received data signal MO by determining the amplitude of the modulated optical signal LM. The optical receiver 57 may receive the modulated optical signal LM and may determine the amplitude of the modulated optical signal LM to generate the received data signal MO based on the determination result. The optical receiver 57 may generate the received data signal MO by comparing the amplitude of the modulated optical signal LM with respect to a reference amplitude. The error ratio of the received data signal MO with respect to the transmission data signal MI may relate to the modulation efficiency of the electro-optic modulation device 30 and reception efficiency of the optical receiver 57. The reference amplitude may be determined based on the efficiency of the components in the photonic integrated circuit 50, for example, the modulation efficiency of the electro-optic modulation device 30, transmission efficiency of the optical waveguides in the electro-optic modulation device 30, the reception efficiency of the optical receiver 57, etc. The electrical signal generator 51 and the electro-optic modulation device 30 may be integrated in the same substrate, such as a SOI substrate, a bulk substrate, etc.

The electro-optic modulation device 30 of the photonic integrated circuit 50 may efficiently generate the modulated optical signal LM based on the electrical signal VI by efficiently varying the phases of the optical signals. As described above, the electro-optic modulation device 30 may efficiently change the phase difference between the phases of the optical signal LI and the optical output signal LO using a relatively shorter silicon phase shifter 10. Accordingly, the photonic integrated circuit 50 according to exemplary embodiments may have a higher degree of integration due to the relatively shorter silicon phase shifter 10 included in the electro-optic modulation device 30.

Figure 8:
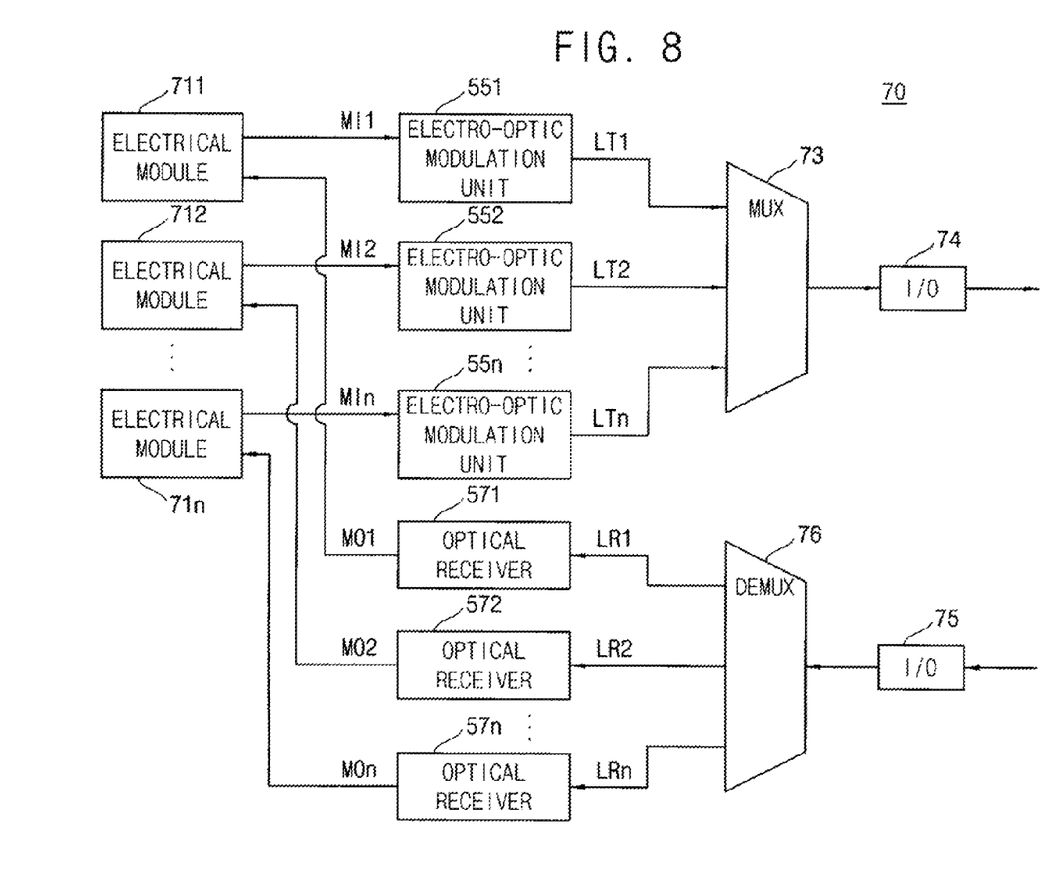
FIG. 8 is a diagram illustrating a photonic integrated circuit system according to some exemplary embodiments.

FIG. 8 is a diagram illustrating a photonic integrated circuit system according to some exemplary embodiments.

Referring to FIG. 8, a photonic integrated circuit system 70 includes a plurality of electrical modules 711, 712, ..., 71n, a plurality of electro-optic modulation devices 551, 552, ..., 55n, a optical multiplexer 73, I/O drivers 74 and 75, a optical demultiplexer 76 and a plurality of optical receivers 571, 572, ..., 57n.

The electro-optic modulation units 551, 552, ..., 55n receive a plurality of transmission data signals MI1, MI2, ..., MIn from the respective electrical modules 711, 712, ..., 71n and generate a plurality of optical transmission signals LT1, LT2, ..., LTn based on the transmission data signals MI1, MI2, ..., MIn. Each of the optical transmission signals LT1, LT2, ..., LTn may have a different wave length. The optical multiplexer 73 may generate a multiplexed optical signal by multiplexing the optical transmission signals LT1, LT2, ..., LTn. The I/O driver 74 outputs a multiplexed optical signal to an external optical device such as a silicon waveguide, an optical cable, a photonic communication network, etc. The external optical device may be formed on the same substrate as the photonic integrated circuit system 70, or may be independently implemented using different materials or components.

The I/O driver 75 receives a multiplexed optical signal through the external optical device and provides the multiplexed optical signal to the optical demultiplexer 76. The optical demultiplexer 76 demultiplexes the multiplexed optical to generate a plurality of received optical signals LR1, LR2, . . . , LRn. Since the received optical signals LR1, LR2, . . . , LRn correspond to the optical transmission signals LT1, LT2, . . . , LTn, the received optical signals LR1, LR2, . . . , LRn may have wavelengths corresponding to the wavelengths of the respective optical transmission signals LT1, LT2, . . . , LTn. The plurality of optical receivers 571, 572, . . . , 57n receive the respective received optical signals LR1, LR2, . . . , LRn and generate a plurality of received data signals MO1, MO2, . . . , MOn based on the respective received optical signals LR1, LR2, . . . , LRn. Thus, the photonic integrated circuit system 70 may provide an efficient photonic interface among the electrical modules 711, 712, . . . , 71n by using the efficient electro-optic modulation units 551, 552, . . . , 55n. Moreover, the photonic integrated circuit system 70 may have a higher degree of integration due to the electro-optic modulation efficiency.

Each of the electro-optic modulation units 551, 552, . . . , 55n is similar to the electro-optic modulation unit 55 of FIG. 7 and each of the optical receivers 571, 572, . . . , 57n is similar to the optical receiver 57 of FIG. 7. Thus, a repeated description will be omitted.

Although a silicon phase shifter according to exemplary embodiments has been described as including two or three impurity regions in contact with an optical waveguide, a silicon phase shifter according to exemplary embodiments may include an arbitrary number of impurity regions. Further, although an electro-optic modulation device according to exemplary embodiments has been described as including one or two silicon phase shifters, an electro-optic modulation device according to exemplary embodiments may include more than two silicon phase shifters.

Exemplary embodiments may be used in different types of systems, such as photonic systems. In addition, aspects of the disclosed embodiments may be used in systems such as microprocessor systems, digital signal processors, communication system processors, or other systems that use photonic interfaces or photonic communications, as well as in embedded memory systems. Furthermore, exemplary embodiments may be used in highly integrated photonic integrated circuits (PIC), and in electronic systems including the PIC's.

The foregoing is illustrative of exemplary embodiments and is not to be construed as limiting thereof. Although a few exemplary embodiments have been described, those skilled in the art will readily appreciate that many modifications are possible in exemplary embodiments without materially departing from the novel teachings of the present inventive concept. Accordingly, all such modifications are intended to be included within the scope of the present inventive concept as defined in the claims. Therefore, it is to be understood that the foregoing is illustrative of various exemplary embodiments and is not to be construed as limited to the specific exemplary embodiments disclosed, and that modifications to the disclosed exemplary embodiments, as well as other exemplary embodiments, are intended to be included within the scope of the appended claims.

What is claimed is:

1. A phase shifter including:
   an optical waveguide configured to receive an optical input signal and output an optical output signal;
   a first impurity region including first charge carriers, the first impurity region being disposed in contact with the optical waveguide at a first contact surface;
   a second impurity region including second charge carriers, the second impurity region being disposed in contact with the optical waveguide at a second contact surface, wherein the first and second contact surfaces have respective zigzag patterns with different respective spatial periods; and
   a plurality of electrodes connected to the respective impurity regions, the electrodes configured to receive an electrical signal that corresponds to a phase-shift of the optical output signal with respect to the optical input signal.

2. The phase shifter of claim 1, wherein the electrical signal adjusts respective densities of the charge carriers to vary a magnitude of the phase shift of the optical output signal.

3. The phase shifter of claim 1, wherein the first and second contact surfaces have respective zigzag patterns symmetrically formed with respect to the optical waveguide.

4. The phase shifter of claim 1, wherein the first and second contact surfaces have respective zigzag patterns in phase with each other.

5. The phase shifter of claim 1, wherein the first charge carriers are electrons and the second charge carriers are electron holes.

6. The phase shifter of claim 1, wherein the first impurity region is doped with phosphorus and the second impurity region is doped with boron.

7. The phase shifter of claim 1, wherein the impurity regions further comprise:
   a third impurity region including third charge carriers, the third impurity region being disposed in contact with the optical waveguide at a third contact surface.

8. The phase shifter of claim 7, wherein the first and second charge carriers have a first conduction type and the third charge carriers have a second conduction type opposite to the first conduction type.

9. The phase shifter of claim 7, wherein the first and second charge carriers are electrons and the third charge carriers are electron holes.

10. The phase shifter of claim 1, wherein the optical waveguide and the impurity regions are formed on a silicon-on-insulator (SOI) substrate or a bulk silicon substrate.

11. The phase shifter of claim 1, wherein the zigzag pattern is one of a square wave-like pattern, a triangular wave-like pattern, a sine wave-like pattern, a trapezoid wave-like pattern and a polygonal wave-like pattern, wherein the patterns repeat themselves along the propagation direction of the optical waveguide.

12. An electro-optic modulation device comprising:
   a beam splitter configured to divide an optical input signal into a first optical signal and a second optical signal;
   a phase shifting unit that includes at least one phase shifter, the phase shifting unit being configured to phase shift at least one of the first and second optical signals based on an electrical signal to output a third optical signal and a fourth optical signal; and
   a beam coupler configured to generate a modulated optical output signal based on the third and fourth optical signals,
   wherein each phase shifter includes:
   an optical waveguide configured to receive one of the divided optical signals and output an optical output signal;

a first impurity region including first charge carriers, the first impurity region being disposed in contact with the optical waveguide at a first contact surface;

a second impurity region including second charge carriers, the second impurity region being disposed in contact with the optical waveguide at a second contact surface, wherein the first and second contact surfaces have respective zigzag patterns with different respective spatial periods; and a plurality of electrodes connected to the respective impurity regions, wherein receipt of an electrical signal from at least one of the electrodes changes a density of the respective charge carriers that phase-shifts the corresponding optical output signal with respect to the corresponding divided optical signal.

13. The electro-optic modulation device of claim 12, wherein the beam splitter, the phase shifting unit and the beam coupler are formed on a silicon substrate.

* * * * *